United States Patent
Matsuda

(10) Patent No.: US 7,907,929 B2
(45) Date of Patent: Mar. 15, 2011

(54) COMMUNICATION APPARATUS AND SYSTEM FOR COMMUNICATION

(75) Inventor: Naoki Matsuda, Anjo (JP)

(73) Assignee: Denso Corporation, Kariya (JP)

( * ) Notice: Subject to any disclaimer, the term of this patent is extended or adjusted under 35 U.S.C. 154(b) by 676 days.

(21) Appl. No.: 11/699,980

(22) Filed: Jan. 30, 2007

(65) Prior Publication Data

US 2007/0178838 A1    Aug. 2, 2007

(30) Foreign Application Priority Data

Feb. 2, 2006    (JP) ................................ 2006-025689

(51) Int. Cl.
*H04B 1/16* (2006.01)

(52) U.S. Cl. ............... 455/343.5; 455/569.1; 455/569.2; 455/574; 455/41.2; 455/127.5; 455/343.1; 455/343.2; 455/343.3; 455/343.4

(58) Field of Classification Search .................. 455/574, 455/343, 569.1, 569.2, 41.2, 127.1, 127.5, 455/266, 343.1–343.5

See application file for complete search history.

(56) References Cited

U.S. PATENT DOCUMENTS

| | | |
|---|---|---|
| 2001/0029196 A1 | 10/2001 | Wakamatsu |
| 2003/0083011 A1 * | 5/2003 | Haller et al. .................. 455/41 |
| 2003/0158609 A1 * | 8/2003 | Chiu .............................. 700/22 |
| 2003/0228879 A1 * | 12/2003 | Witkowski et al. ......... 455/550.1 |
| 2004/0076177 A1 * | 4/2004 | Koch et al. .................... 370/465 |
| 2004/0176065 A1 * | 9/2004 | Liu ............................. 455/343.1 |
| 2004/0180701 A1 * | 9/2004 | Livet et al. ...................... 455/574 |
| 2004/0185821 A1 * | 9/2004 | Yuasa ........................ 455/343.5 |
| 2005/0135297 A1 | 6/2005 | Katayama |
| 2005/0202844 A1 * | 9/2005 | Jabri et al. ................ 455/556.1 |
| 2007/0129045 A1 * | 6/2007 | Aerrabotu .................. 455/343.5 |

FOREIGN PATENT DOCUMENTS

| | | |
|---|---|---|
| JP | 2002-033824 | 1/2002 |
| JP | 2003-087367 | 3/2003 |
| JP | 2004-106801 | 4/2004 |
| JP | 2005-033672 | 2/2005 |
| JP | 2005-117426 | 4/2005 |

OTHER PUBLICATIONS

Office Action mailed Nov. 17, 2009 in the corresponding JP application No. 2006-025689 with English translation.

* cited by examiner

*Primary Examiner* — Jinsong Hu
*Assistant Examiner* — Dung Hong
(74) *Attorney, Agent, or Firm* — Harness, Dickey & Pierce, PLC

(57) ABSTRACT

A communication apparatus uses a short range communication function for displaying a decrease of remaining battery power of a cellular phone that is in communication with the communication apparatus based on a report from the cellular phone when the remaining battery power decreases to a predetermined threshold.

10 Claims, 4 Drawing Sheets

COMMUNICATION APPARATUS AND SYSTEM FOR COMMUNICATION

CROSS REFERENCE TO RELATED APPLICATION

This application is based on and claims the benefit of priority of Japanese Patent Application No. 2006-25689 filed on Feb. 2, 2006, the disclosure of which is incorporated herein by reference.

FIELD OF THE INVENTION

The present invention generally relates to a handsfree apparatus used in a vehicle.

BACKGROUND INFORMATION

In recent years, Bluetooth (Registered trademark) communication function is used for communication between a cellular phone and a handsfree apparatus typically installed on a vehicle or the like. Bluetooth communication between the cellular phone and the handsfree apparatus is established based on a handsfree profile that serves as a communication protocol of the Bluetooth standard. In a disclosure in Japanese patent document JP-A-2004-106801, the Bluetooth communication between the cellular phone and the handsfree apparatus is enabled in a stand-by mode for immediately providing a handsfree call through the handsfree apparatus when the cellular phone receives an incoming call.

In the Bluetooth communication based on the handsfree profile, the cellular phone notifies a remaining battery level to the handsfree apparatus. Some of the handsfree apparatus is capable of regularly displaying the remaining battery level on a display window of a car navigation system for improving user's convenience.

However, the remaining battery level regularly displayed on the display window is sometimes overlooked by a user unconsciously as a matter of fact. In other words, the user has always to consciously watch the remaining battery level in order to prevent an unintended disconnection of the Bluetooth communication between the cellular phone and the handsfree apparatus. In addition, an advance warning message of battery exhaustion on a display of the cellular phone such as "Please recharge the cellular phone" or the like may not appropriately be recognized by the user when the body of the cellular phone is stored in an invisible place from of the user. Therefore, the user of the cellular phone fails to recognize the exhaustion of the cellular phone battery and to respond to the advance warning message in a timely manner.

SUMMARY OF THE INVENTION

In view of the above-described and other problems, the present disclosure provides a communication apparatus that appropriately notifies a user of a cellular phone of a battery exhaustion below a predetermined level by using a short range wireless communication function for an improved convenience of the user. The communication apparatus can be used in combination with the cellular phone as a system for achieving the same objective.

In the present disclosure, the communication apparatus for use in a vehicle with a function of short range wireless communication according to a communication protocol with a cellular phone of a battery operation includes a communication unit for communicating information by the short range wireless communication according to the communication protocol with the cellular phone, a notification unit for notifying a user of the information in a directly recognizable form for the user, and a control unit for controlling notification of the warning information for the user by the notification unit. The information communicated by the communication unit includes information on remaining battery power of the battery in the cellular phone, and the information notified by the notification unit includes warning information on the remaining battery power of the battery in the cellular phone. In addition, the notification of the warning information by the notification unit is provided for the user under control of the control unit only on a condition that the remaining battery power is equal to or less than a predetermined amount when the communication unit and the cellular phone are having the short range wireless communication according to the communication protocol. In this manner, the remaining battery power of the cellular phone equipped with the short range communication function is notified to the user only when the remaining battery power decreases to a predetermined threshold instead of regularly displaying the remaining battery power for improved convenience of the user. Further, the decrease of the remaining battery power is appropriately notified to the user even when the cellular phone is stored in an invisible place such as an inside of a pocket of the clothes, a bag or the like.

Further, disconnection of the protocol of the short range communication can be selected by the user for reducing energy consumption caused by maintaining the protocol. Therefore, the battery life of the cellular phone can be elongated. Alternatively, continued connection of the protocol may be selected for having the short range communication function.

Furthermore, the protocol can be forcefully disconnected by the communication apparatus when the remaining battery power decreases to a certain level. In this manner, the battery life of the cellular phone can also be elongated.

Furthermore, plural protocols can be selectively disconnected by the communication apparatus for the elongation of the battery life based on an input from the user when the plural protocols are activated. Alternatively, continued connection of the protocol may be selected for keeping the associated function available.

Furthermore, the communication apparatus can be operated as a system in combination with the cellular phone that is equipped with the short range communication function.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present invention are described with reference to the drawings. Like parts have like numbers in each of the embodiments. The following embodiments describe a short range communication between a handsfree apparatus and a cellular phone according to the Bluetooth communication protocol as a handsfree system for use in a vehicle. More practically, the handsfree apparatus and the cellular phone communicate with each other by using a handsfree profile (HFP) of the Bluetooth protocol.

First Embodiment

Figure 1:
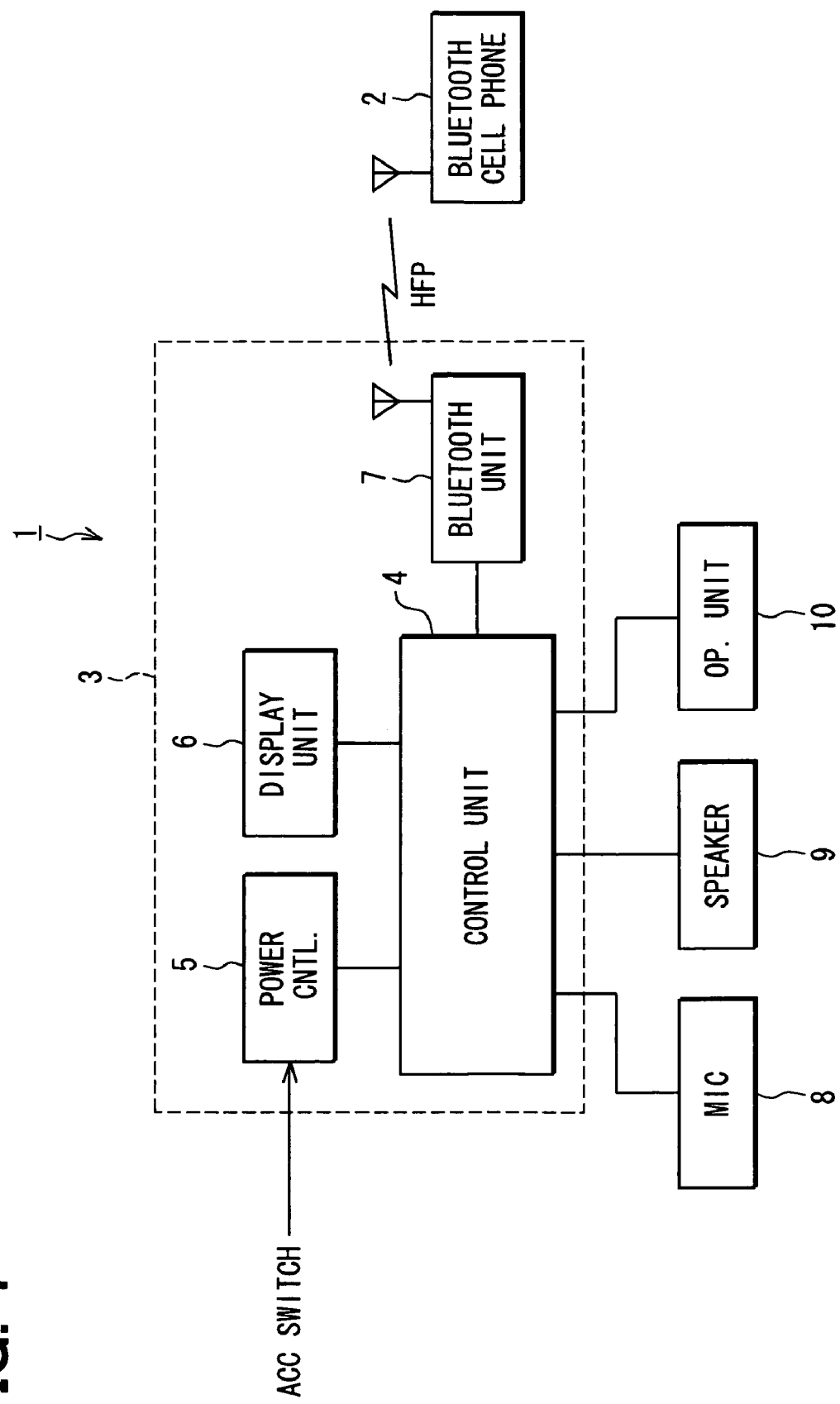
FIG. 1 shows a block diagram of a handsfree system in a first embodiment of the present disclosure.

FIG. 1 shows a block diagram of a handsfree system 1 in a first embodiment of the present disclosure. In the handsfree system 1, a handsfree cellular phone 2 and a handsfree apparatus 3 on the vehicle are both capable of having Bluetooth communication with each other according to the Bluetooth communication protocol. The cellular phone 2 operates on a rechargeable battery (e.g., a lithium battery), and is being connectable to other cellular phones and wireline phones through a cellular phone network.

The handsfree apparatus 3 includes a control unit 4, a power controller 5, a display unit 6, and a Bluetooth unit 7. The control unit 4 includes a CPU, a RAM, a ROM and the like for executing a control program for operations of the handsfree apparatus 3.

The power control unit 5 is configured to, for example, receive an ACC ON signal and an ACC OFF signal from an ACC switch when the ACC switch is turned ON and OFF. When the ACC ON signal is provided, the power control unit 5 provides an operation power to the control unit 4 for activating an entire system. When the ACC OFF signal is provided, the power control unit 5 shuts provision of the operation power to the control unit 4 for stopping the entire system. The power control unit 5 is configured to watch an input of the ACC ON signal on a nominal power consumption even when the entire system is not activated.

The display unit 6 is disposed at a position that can directly be observed by a user of the handsfree system. The display unit 6 executes a display operation according to a display instruction signal when the display instruction signal is inputted from the control unit 4. The Bluetooth unit 7 uses the handsfree profile for establishing communication with the cellular phone 2.

The control unit 4 transmits an outbound voice from a microphone 8 to the cellular phone 2 through the Bluetooth unit 7 for transmission to another phone. The control unit 4 outputs an inbound voice from a speaker 9 after transmission from the cellular phone 2 to the Bluetooth unit 7. The control unit 4 executes an operation according to an input of an operation signal based on a user input from an operation unit 10. In this case, the operation unit 10 may be a mechanical switch that mechanically accepts an input, or may be a touch switch that is displayed on the display unit 6 for accepting an input.

Figure 2:
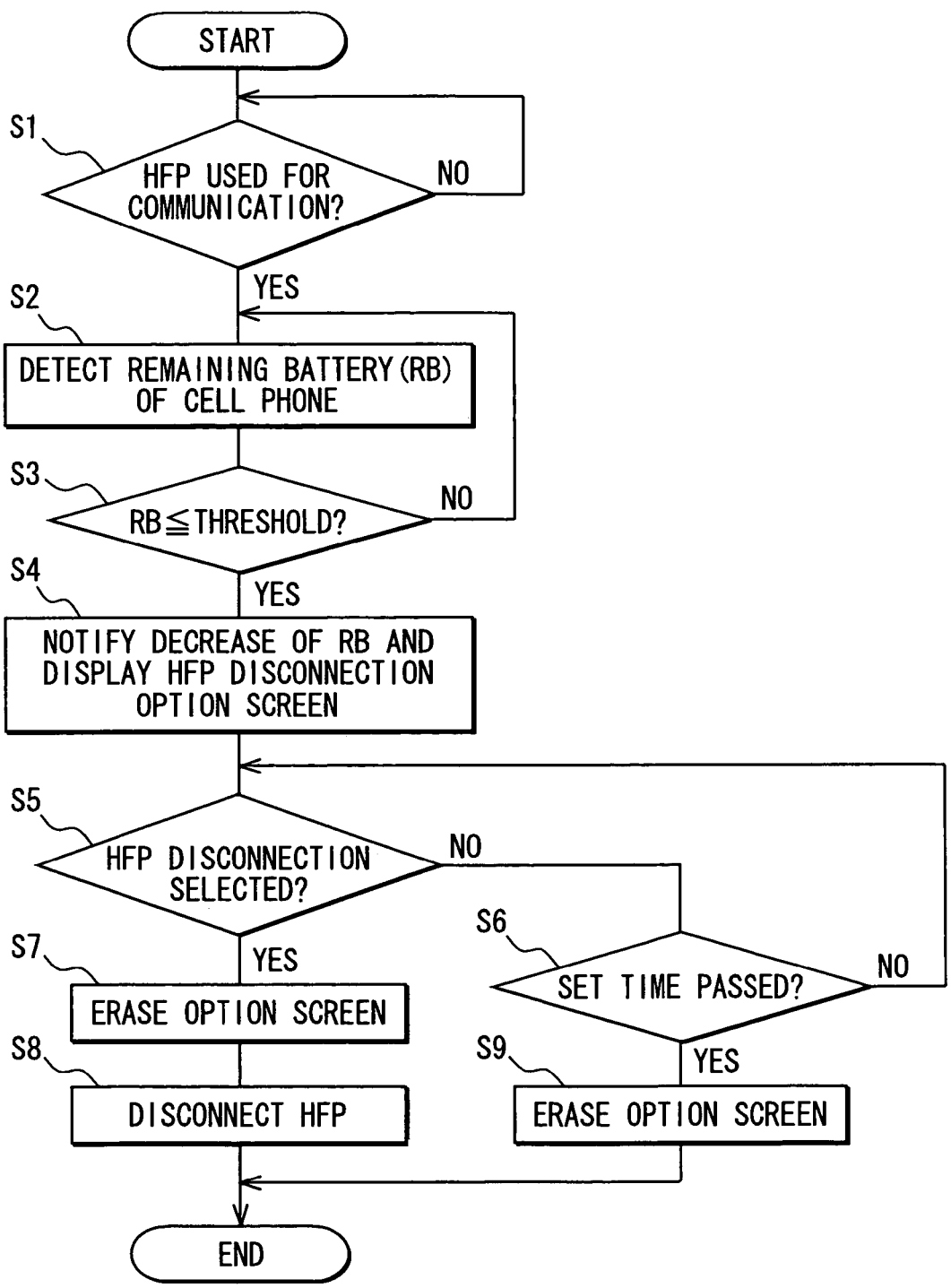
FIG. 2 shows a flowchart of a process in a control unit in the first embodiment.

FIG. 2 shows a flowchart of a process in the control unit 4 in the first embodiment. The operation of the handsfree system 1 is described with reference to the flowchart in FIG. 2. In this case, the operation of the handsfree system 1 is described based on an assumption that the handsfree system 1 automatically establishes the communication between the handsfree apparatus 3 and the cellular phone 2 with the HFP when the apparatus 3 and the cellular phone 2 are connectable with the Bluetooth communication.

In step S1, the process in the control unit 4 of the handsfree apparatus 3 determines whether the communication between the Bluetooth unit 7 and the cellular phone 2 is established by using the HFP when the entire system is turned on after an input of the ACC ON signal to the power control unit 5. The process proceeds to step S2 when it detects a condition that the cellular phone 2 is connectable with the HFP by being within a Bluetooth communication range and that the cellular phone 2 is using the HFP for Bluetooth communication (step S1: YES). The process returns to a start of the process when the HFP is not used (step S1: NO).

In step S2, the process detects a remaining battery power (RB) of the cellular phone 2 based on a notification from the cellular phone 2 in the course of connection operation of the HFP.

In step S3, the process determines whether the remaining battery power (RB) notified from the cellular phone 2 is equal to or smaller than a predetermined threshold. In this case, the predetermined threshold may be a value that is set in a production process of the system 1, or may be a value arbitrarily set by the user. The value arbitrarily set by the user is, for example, equal to or greater than the value that is assumed to sustain a normal operation of the cellular phone 2 until recharging of the battery. The process proceeds to step S4 when the remaining battery power (RB) is equal to or smaller than the threshold (step S3: YES). The process returns to step S2 when the remaining battery power (RB) is greater than the threshold (step S3: NO).

In step S4, the process notifies the user of the decrease of the remaining battery power (RB) by, for example, voicing "The remaining battery of the cellular phone is low. Would you like to stop handsfree standby function?" or the like, and displays a screen for allowing the user to choose one of two options whether or not to stop the handsfree standby function (i.e., Disconnection of the HFP). In this manner, the user can have an idea that the remaining battery of the cellular phone 2 is decreasing less than the threshold, and can have an option to disconnect the HFP.

In step S5, the process determines whether the user has selected the disconnection of the HFP. The process proceeds to step S7 when the user has selected the disconnection of the HFP by operating the operation unit 10 before a set time after displaying the screen for option selection (step S5: YES). The process proceeds to step S6 when the user does not select the disconnection of the HFP before the set time has passed (i.e., selection for continuation of the HFP by the user) (step S5: NO).

In step S6, the process determines whether the set time has passed since the screen for option selection is displayed. The process returns to step S5 when the set time has not passed (step S6: NO). The process proceeds to step S9 when the set time has passed (step S6: YES).

In steps S7 and S8, the process erases the screen for option selection, and controls the Bluetooth unit 7 to disconnect the HFP before concluding the process itself.

In step S9, the process erases the screen for option selection before concluding the process itself without controlling the Bluetooth unit 7 to disconnect the HFP.

In the above description of the first embodiment, the HFP with the cellular phone 2 may be forcefully disconnected by the Bluetooth unit 7 without displaying the screen for option selection.

The first embodiment of the present disclosure enables the handsfree apparatus 3 to displays a message of decrease of the remaining battery of the cellular phone 2 only when the remaining battery power based on the notification from the cellular phone 2 is equal to or smaller than the predetermined threshold, thereby appropriately attracting user's attention in terms of the decrease of the remaining battery power even when the cellular phone 2 itself is stored in an invisible place such as a pocket of clothes, a bag or the like. In this manner, the convenience of the handsfree system 1 for the user is effectively improved.

Further, the screen for option selection is displayed for allowing the user to choose from disconnection and maintenance of the HFP, thereby enabling the user to choose one of two operation conditions, that is, the first condition having an elongated battery operation time of the cellular phone 2 to next recharging by disconnecting the HFP for reduction of energy consumption and the second condition having a continued handsfree standby function of the cellular phone 2 by maintaining the HFP.

Second Embodiment

A second embodiment of the present disclosure is described with reference to FIGS. 3 and 4. The focus of the description is mainly directed to the difference between the first embodiment and the second embodiment. That is, in the second embodiment, the handsfree profile (HFP) and an audio-visual profile (AVP) are simultaneously used for communication between the handsfree apparatus and the cellular phone.

In this case, the operation of a handsfree system 11 is described based on an assumption that the handsfree system 11 automatically establishes the communication between a handsfree apparatus 13 and a cellular phone 12 with the HFP when the apparatus 13 and the cellular phone 12 are connectable with the Bluetooth communication, and the audio-visual profile (AVP) is additionally used based on a connection request from either side of the communication.

Figure 3:
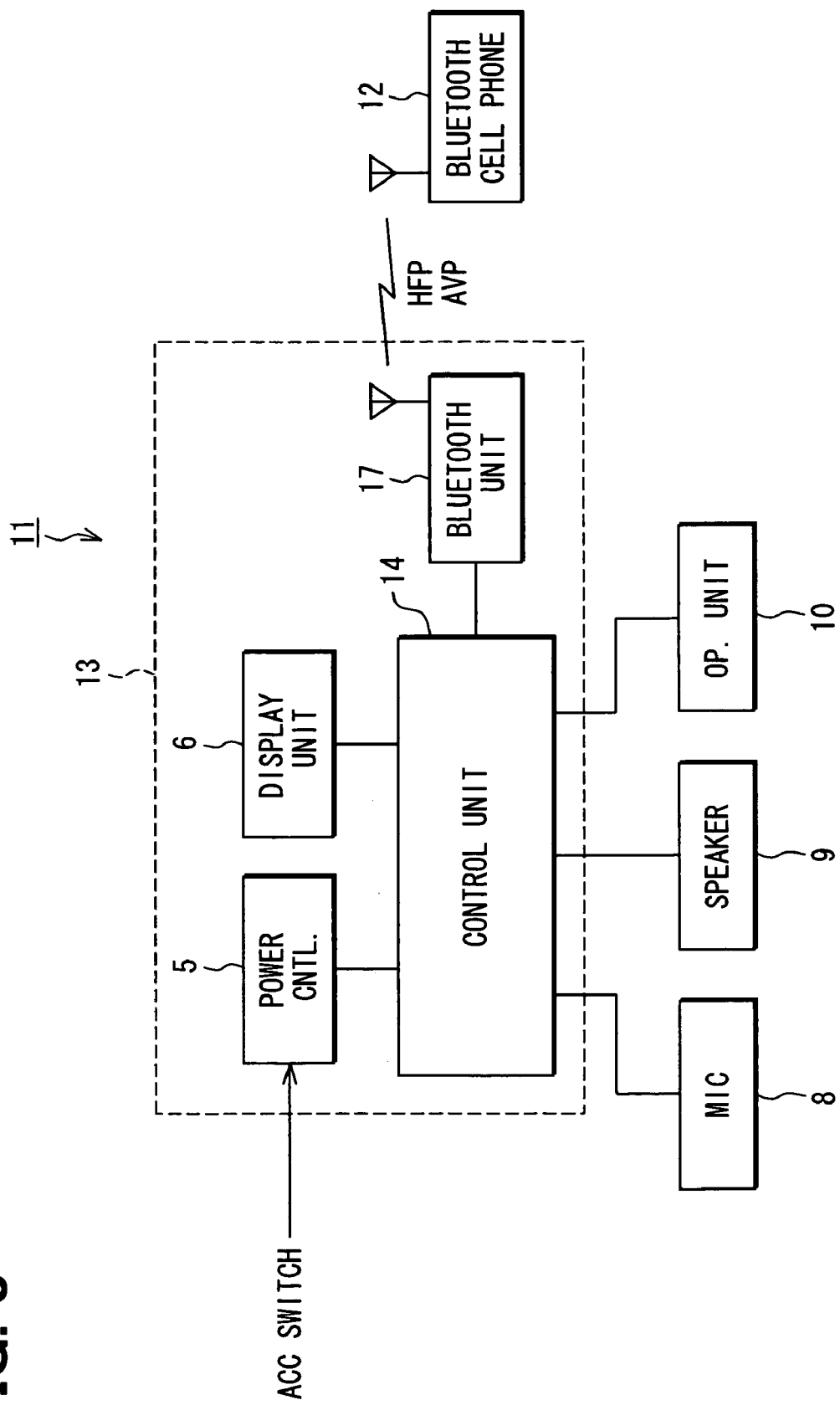
FIG. 3 shows a block diagram of a handsfree system in a second embodiment.
Figure 4:
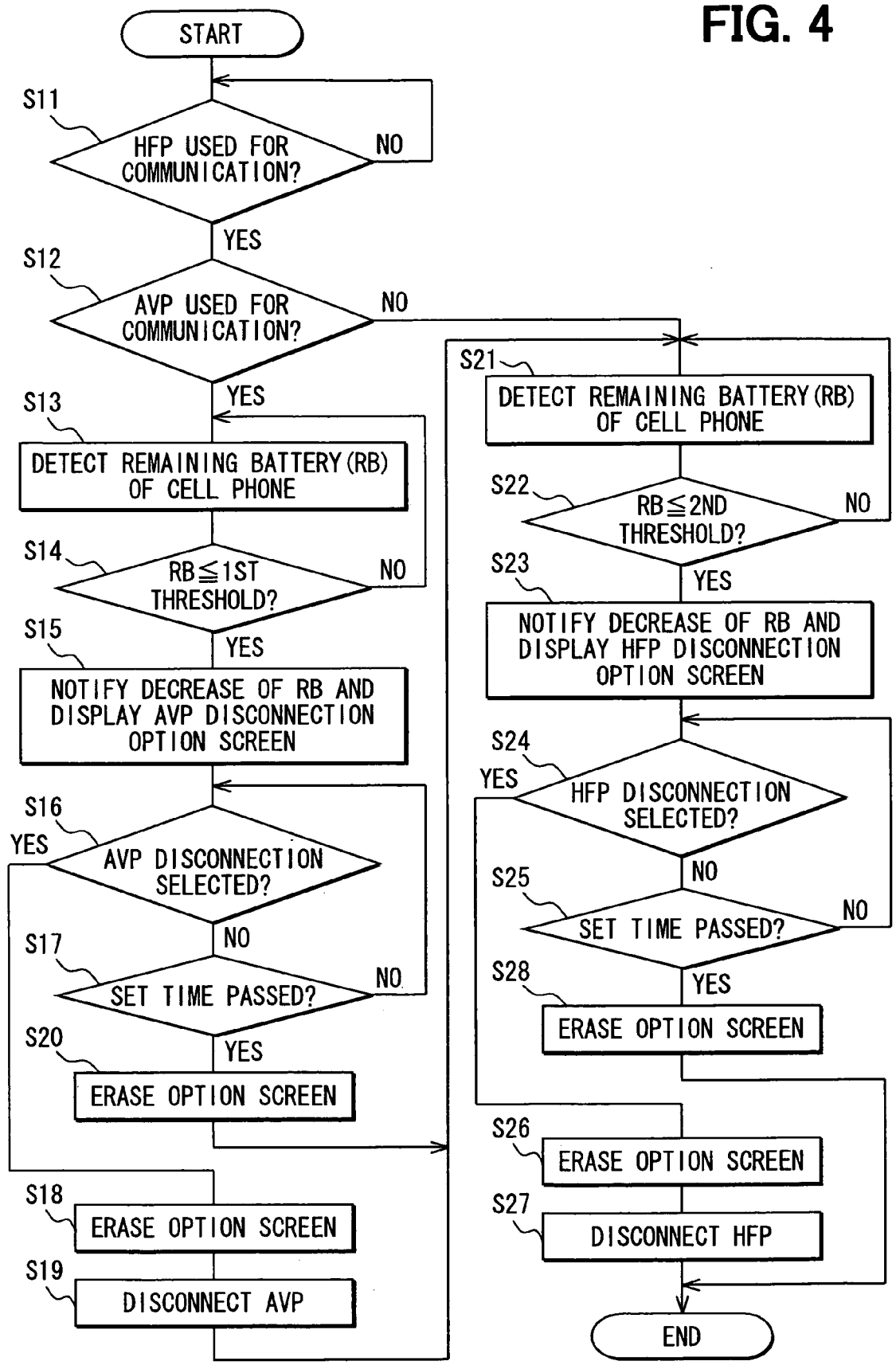
FIG. 4 shows a flowchart of a process in the control unit in the second embodiment.

FIG. 3 shows a block diagram of a handsfree system 11 in the second embodiment of the present disclosure, and FIG. 4 shows a flowchart of a process in a control unit 14 in the present embodiment.

The handsfree apparatus 13 includes the control unit 14 and a Bluetooth unit 17 beside having the power control unit 5 and the display unit 6.

In step S11, the process in the control unit 14 determines whether the cell the communication between the Bluetooth unit 17 and the cellular phone 12 is established by using the HFP. The process proceeds to step S12 when it detects a condition that the cellular phone 12 is connectable with the HFP by being within the Bluetooth communication range and that the cellular phone 12 is using the HFP for Bluetooth communication (step S11: YES). The process returns to a start of the process when the HFP is not used (step S11: NO).

In step S12, the process determines whether the AVP is used for the communication between the Bluetooth unit 17 and the cellular phone 12. The process proceeds to step S13 when the communication uses the AVP (step S12: YES). The process proceeds to steps S21 to S27 (equivalent of steps S2 to S9 of the first embodiment) before concluding itself when the communication does not use the AVP (step S12: NO). In this case, a second threshold in step S22 is an equivalent of the predetermined threshold in the first embodiment, and the second threshold may be a value that is set in a production process of the system 11, or may be a value arbitrarily set by the user. The value arbitrarily set by the user is, for example, equal to or greater than the value that is assumed to sustain the normal operation of the cellular phone 12 until recharging of the battery.

In step S13, the process detects a remaining battery power (RB) of the cellular phone 12 based on a notification from the cellular phone 12 in the course of connection operation of the HFP.

In step S14, the process determines whether the remaining battery power (RB) notified from the cellular phone 12 is equal to or smaller than a first predetermined threshold. In this case, the first threshold may be a value that is set in a production process of the system 11, or may be a value arbitrarily set by the user. The value arbitrarily set by the user is, for example, equal to or greater than the value that is assumed to sustain a normal operation of a handsfree standby function of the cellular phone 12 until recharging of the battery. The process proceeds to step S15 when the remaining battery power (RB) is equal to or smaller than the first threshold (step S14: YES). The process returns to step S13 when the remaining battery power (RB) is greater than the first threshold (step S14: NO).

In step S15, the process notifies the user of the decrease of the remaining battery power (RB) by, for example, voicing "The remaining battery of the cellular phone is low. Would you like to stop an audio-visual function?" or the like, and displays a screen for allowing the user to choose one of two options whether or not to stop the audio-visual function (i.e., Disconnection of the AVP). In this manner, the user can have an idea that the remaining battery of the cellular phone 12 is decreasing less than the threshold, and can have an option to disconnect the AVP.

In step S16, the process determines whether the user has selected the disconnection of the AVP. The process proceeds to step S18 when the user has selected the disconnection of the AVP by operating the operation unit 10 before a set time after displaying the screen for option selection (step S16: YES). The process proceeds to step S17 when the user does not select the disconnection of the AVP before the set time has passed (i.e., selection for continuation of the AVP by the user) (step S16: NO).

In step S17, the process determines whether the set time has passed since the screen for option selection is displayed. The process returns to step S16 when the set time has not passed (step S17: NO). The process proceeds to step S20 when the set time has passed before selection for continuation of the AVP by the user (step S17: YES).

In steps S18 and S19, the process erases the screen for option selection on the display unit 6, and controls the Bluetooth unit 7 to disconnect the AVP that is established with the cellular phone 12. After step 19, the process executes steps S21 to S27 equivalent to steps S2 to S9 in the first embodiment, and concludes the process.

In step S20, the process erases the screen for option selection without controlling the Bluetooth unit 17 to disconnect the AVP with the cellular phone 12, and proceeds to steps S21 to S27 (equivalent of steps S2 to S9 of the first embodiment) before concluding the process itself.

In the above description of the second embodiment, the AVP with the cellular phone 12 may be forcefully disconnected by the Bluetooth unit 17 without displaying the screen for option selection.

The second embodiment of the present disclosure enables the handsfree apparatus 13 to displays a message of decrease of the remaining battery of the cellular phone 12 only when the remaining battery power based on the notification from the cellular phone 12 is equal to or smaller than the first threshold, thereby appropriately attracting user's attention in terms of the decrease of the remaining battery power even when the cellular phone 12 itself is stored in an invisible place such as a pocket of clothes, a bag or the like. In this manner, the convenience of the handsfree system 11 for the user is effectively improved.

Further, the screen for option selection is displayed for allowing the user to choose from disconnection and maintenance of the AVP, thereby enabling the user to have the following operation condition, that is, the operation condition having an elongated battery operation time of the cellular phone 12 to next recharging by disconnecting the AVP for reduction of energy consumption, accompanied by a continued operation of the handsfree standby function of the cellular phone 12.

Although the present invention has been fully described in connection with the preferred embodiment thereof with reference to the accompanying drawings, it is to be noted that various changes and modifications will become apparent to those skilled in the art.

For example, the cellular phone having the function of the short range communication by the Bluetooth protocol may be replaced with a personal digital assistant having the Bluetooth communication function and a standard cellular phone function.

The handsfree apparatus 3, 13 may be activated by having an operation on a start button on the handsfree apparatus 3, 13.

The message of decrease of the remaining battery power and the option selection screen for disconnection of the profile may be superposed on a navigation map screen of a navigation system when the navigation system is equipped with the function of the handsfree apparatus 3, 13. Further, the message and the option selection screen may be displayed separately on different occasions.

The message of decrease of the remaining battery power and option selection for disconnection of the profile may be vocally provided for the user as a voice guidance. Further, the voice guidance may be accompanied by the message and the option selection screen on the display unit.

A dial up network profile (DUNP) of the Bluetooth protocol may be used besides the HFP and the AVP.

The HFP disconnection option screen may be displayed before displaying the AVP disconnection option screen in the second embodiment. Further, a display order of the disconnection option screens may be selectively configured according to a usage of a specific user. In this manner, the priority of the handsfree standby function and the audio-visual function can be easily switched for accommodating the usage of the specific user in a flexible manner.

Such changes and modifications are to be understood as being within the scope of the present invention as defined by the appended claims.

What is claimed is:

1. A communication apparatus having a function of short range wireless communication according to plural instances of communication protocol with a cellular phone being operable on a battery, the communication apparatus for use in a vehicle comprising:
   a communication unit for communicating information by the short range wireless communication according to at least one of the plural instances of the communication protocol with the cellular phone, wherein the information includes information on remaining battery power of the battery in the cellular phone;
   a notification unit for notifying a user of the information in a directly recognizable form for the user, wherein the information includes warning information on the remaining battery power of the battery in the cellular phone; and
   a control unit for controlling notification of the warning information for the user by the notification unit, wherein
   the notification of the warning information by the notification unit is provided for the user under control of the control unit after a determination that the remaining battery power is equal to or less than a predetermined amount when the communication unit and the cellular phone are having the short range wireless communication established therebetween according to the plural instances of communication protocol;
   based on the determination that the remaining battery power is equal to or less than the predetermined amount, the control unit automatically controls the notification unit for notifying the user of a query information that queries the user about an intention of disconnection of the short range wireless communication according to one of the plural instances of the established communication protocol with the cellular phone after the notification of the warning information on the remaining battery power when the short range wireless communication between the communication unit and the cellular phone has been established according to the plural instances of the communication protocol,
   the control unit controls the communication unit to disconnect the short range wireless communication with the cellular phone according to the one of the plural instances of the established communication protocol when the user chooses to disconnect the short range wireless communication according to the one of the plural instances of the established communication protocol in response to the query information for disconnection; and
   the control unit maintains the short range wireless communication according to the plural instances of the communication protocol without the disconnection of the short range wireless communication by the communication unit when a response of the user to the query information for disconnection does not indicate the disconnection of the short range wireless communication according to any of the plural instances of the communication protocol.

2. The communication apparatus as in claim 1,
   wherein, when the short range wireless communication between the communication unit and the cellular phone has been established according to a specific instance of the communication protocol, the control unit controls the notification unit for notifying the user of the query information that queries the user about the intention of disconnection of the short range wireless communication according to the specific instance of the communication protocol with the cellular phone after the notification of the warning information on the remaining battery power for the user, and
   the control unit disconnects the short range wireless communication with the cellular phone according to the specific instance of the communication protocol when the user affirmatively responds to the query information for disconnection of the short range wireless communication according to the specific instance of the communication protocol.

3. The communication apparatus as in claim 2,
   wherein the control unit maintains the short range wireless communication according to the specific instance of the communication protocol without the disconnection of the short range wireless communication by the communication unit when a response of the user to the query information for disconnection does not indicate the disconnection of the short range wireless communication.

4. The communication apparatus as in claim 1,
   wherein the control unit forcefully controls the communication unit to disconnect the short range wireless communication with the cellular phone according to the specific instance of the communication protocol on the condition that the remaining battery power is equal to or less than the predetermined amount when the short range wireless communication between the communication unit and the cellular phone has been established according to the specific instance of the communication protocol.

5. The communication apparatus as in claim 1,
wherein the control unit forcefully controls the communication unit to disconnect the short range wireless communication with the cellular phone according to the one of the plural instances of the communication protocol on the condition that the remaining battery power is equal to or less than the predetermined amount when the short range wireless communication between the communication unit and the cellular phone has been established according to the plural instances of the communication protocol.

6. A communication system for a short range wireless communication comprising:
a cellular phone having a function of the short range wireless communication as in claim 1; and
the communication apparatus having the function of the short range wireless communication as in claim 1.

7. A communication apparatus having a function of short range wireless communication according to plural instances of communication protocol with a cellular phone being operable on a battery, the communication apparatus for use in a vehicle comprising:
a communication unit for communicating information by the short range wireless communication according to at least one of the plural instances of the communication protocol with the cellular phone, wherein the information includes information on remaining battery power of the battery in the cellular phone;
a notification unit for notifying a user of the information in a directly recognizable form for the user, wherein the information includes warning information on the remaining battery power of the battery in the cellular phone; and
a control unit for controlling notification of the warning information for the user by the notification unit, wherein
the notification of the warning information by the notification unit is provided for the user under control of the control unit after a determination that the remaining battery power is equal to or less than a predetermined amount when the communication unit and the cellular phone are having the short range wireless communication established therebetween according to the plural instances of communication protocol;
based on the determination that the remaining battery power is equal to or less than the predetermined amount, the control unit automatically controls the notification unit for notifying the user of a query information that queries the user about an intention of disconnection of the short range wireless communication according to one of the plural instances of the established communication protocol with the cellular phone after the notification of the warning information on the remaining battery power when the short range wireless communication between the communication unit and the cellular phone has been established according to the plural instances of the communication protocol,
the control unit controls the communication unit to disconnect the short range wireless communication with the cellular phone according to the one of the plural instances of the established communication protocol when the user chooses to disconnect the short range wireless communication according to the one of the plural instances of the established communication protocol in response to the query information for disconnection;
when the short range wireless communication between the communication unit and the cellular phone has been established according to a specific instance of the communication protocol, the control unit controls the notification unit for notifying the user of the query information that queries the user about the intention of disconnection of the short range wireless communication according to the specific instance of the communication protocol with the cellular phone after the notification of the warning information on the remaining battery power for the user,
the control unit disconnects the short range wireless communication with the cellular phone according to the specific instance of the communication protocol when the user affirmatively responds to the query information for disconnection of the short range wireless communication according to the specific instance of the communication protocol; and
the control unit maintains the short range wireless communication according to the specific instance of the communication protocol without the disconnection of the short range wireless communication by the communication unit when a response of the user to the query information for disconnection does not indicate the disconnection of the short range wireless communication.

8. The communication apparatus as in claim 7,
wherein the control unit forcefully controls the communication unit to disconnect the short range wireless communication with the cellular phone according to the specific instance of the communication protocol on the condition that the remaining battery power is equal to or less than the predetermined amount when the short range wireless communication between the communication unit and the cellular phone has been established according to the specific instance of the communication protocol.

9. The communication apparatus as in claim 7,
wherein the control unit forcefully controls the communication unit to disconnect the short range wireless communication with the cellular phone according to the one of the plural instances of the communication protocol on the condition that the remaining battery power is equal to or less than the predetermined amount when the short range wireless communication between the communication unit and the cellular phone has been established according to the plural instances of the communication protocol.

10. A communication system for a short range wireless communication comprising:
a cellular phone having a function of the short range wireless communication as in claim 7; and
the communication apparatus having the function of the short range wireless communication as in claim 7.

* * * * *